US005756942A

United States Patent [19]

Tanaka et al.

[11] Patent Number: 5,756,942

[45] Date of Patent: May 26, 1998

[54] VIBRATION-DAMPING SECTION WITH SOUND ABSORBING MATERIAL

[75] Inventors: Toshimitsu Tanaka; Nobuteru Hayashi, both of Kobe; Syunichi Umemoto, Tokyo; Kenji Iwai, Tokyo; Hiroshi Tanimoto, Tokyo; Akio Sugimoto, Kobe, all of Japan

[73] Assignee: Kabushiki Kaisha Kobe Seiko Sho, Kobe, Japan

[21] Appl. No.: 734,453

[22] Filed: Oct. 17, 1996

[30] Foreign Application Priority Data

Oct. 23, 1995 [JP] Japan .................................... 7-299139

[51] Int. Cl.$^6$ ........................................ F16F 15/00

[52] U.S. Cl. ........................ 181/207; 181/210; 181/286; 181/290

[58] Field of Search .................................. 181/210, 207, 181/208, 209, 286, 288, 290, 291, 292, 295

[56] References Cited

U.S. PATENT DOCUMENTS

| | | | |
|---|---|---|---|
| 4,064,960 | 12/1977 | Murakami | 181/210 |
| 4,450,931 | 5/1984 | Yamashita et al. | 181/210 X |
| 4,741,945 | 5/1988 | Brant et al. . | |
| 4,821,841 | 4/1989 | Woodward et al. | 181/286 |
| 5,587,564 | 12/1996 | Stief et al. | 181/295 |

OTHER PUBLICATIONS

Patent Abstracts of Japan, vol. 014, No. 305 (M–0992), Jun. 29, 1990, JP–A–02 098435, Apr. 10, 1990.

Patent Abstracts of Japan, vol. 095, No. 010, Nov. 30, 1995, JP–A–07 180118, Jul. 18, 1995.

*Primary Examiner*—Khanh Dang
*Attorney, Agent, or Firm*—Oblon, Spivak, McClelland, Maier & Neustadt, P.C.

[57] ABSTRACT

A vibration-damping section with sound absorbing material includes a sound proof panel, sound absorbing material fixed on one surface thereof and vibration damping material stuck on the top surface or the bottom surface of the sound proof panel one surface of the sound absorbing material which is the opposite side of the sound proof panel can be covered with a porous panel, if necessary, and moreover a joint is provided for hanging and connecting sections for closely connecting themselves one another in a width direction. Since the vibration-damping section with sound absorbing material according to the present invention has above described structure, in particular, it can be fixed on the bottom surface of an elevated bridge and has a sound insulating effect of the radiated noise which are caused by the elevated bridge structure and a sound absorbing effect of the reflected noise and moreover has a vibration damping effect of decreasing occurrence of the secondary noise by reducing the vibration of the sound absorbing panel.

9 Claims, 6 Drawing Sheets

VIBRATION-DAMPING SECTION WITH SOUND ABSORBING MATERIAL

BACKGROUND OF THE INVENTION

The present invention relates to a vibration-damping section with sound absorbing material fixed on a wall panel or a floor panel surrounding the engine room of a ship, a wall panel or a floor panel of a factory building where machines are operated, or the bottom surface of the elevated bridge girder of a motorway or a railroad, in particular, the whole bottom surface of the elevated bridge girder made of steel, and insulating and damping solid-borne noises radiated from the elevated bridge structure and having sound absorbability and also suitable for a scaffold.

Vibration generated by a vehicle running on an expressway, for example, is radiated from a floor panel via a girder to cause serious environmental problems under the elevated bridge or in the vicinity thereof. It is said, in particular, that when a steel girder is used for an elevated bridge instead of RC structure used in the past, radiated noises (or solid-borne noises) generally becomes larger by 5–10 dB under the elevated bridge in comparison with the equivalent RC structure used in the past. And it is said that when a flat road is under the elevated bridge, noises under the elevated bridge becomes larger by about 3 dB in addition because noises generated by vehicles running on the flat road is reflected by the floor panel of the elevated bridge etc. As a means for reducing this noise, sound absorbing panels have been fixed on the whole bottom surface of the elevated bridge. This sound absorbing panel generally comprises a sound proof panel made of steel, a sound absorbing material, such as glass wool, rock wool, foaming aluminum or foaming concrete etc. disposed under the sound proof panel and, if necessary, a porous panel covering the bottom surface of the sound absorbing material. This sound absorbing panel has sound insulating effect of the radiated noise by the sound proof panel and sound reducing effect of the reflected noise by the sound absorbing material.

But there happens a problem that when the above described sound absorbing panel is fixed on the bottom surface of the girder, vibration radiated from the elevated bridge structure is transferred to the sound absorbing panel to vibrate the sound absorbing panel itself, thereby generating secondary noise (or solid-borne noise). In particular, in the elevated bridge structure using a steel girder, this problem of solid-borne noise is very serious. Such a problem of the solid-borne noise has also become a problem, for example, in the case of noise caused by the vibration of the engine of a ship or a factory building where a lot of machines are operated.

The purpose of the present invention is to solve such problems in the past as above described and, in particular, to provide a vibration-damping section with sound absorbing material having sound insulating effect of the radiated noise and sound absorbing effect of the reflected noise caused by the elevated bridge structure among solid-borne noises caused by the vibration above described and having vibration damping effect reducing the vibration of the sound absorbing panel and thereby decreasing occurrence of secondary noises.

SUMMARY OF THE INVENTION

The present invention relates to a vibration-damping section with sound absorbing material and, more specifically, to a vibration-damping section with sound absorbing material comprising a sound proof panel with vibration damping material stuck on at least one surface thereof and sound absorbing material disposed around the sound proof panel. And the sound absorbing material can be covered with a porous panel, if necessary. Moreover, the vibration-damping section with sound absorbing material can have a joint for hanging and a connecting section for closely connecting at the end in a width direction and these above described sound proof panel, the joint and the connecting section can be integrally molded as a hollow frame by using an extrusion process. Aluminum or aluminum alloy is suitable for this extruded material and the porous panel can also be integrally molded by the extrusion process with these members.

Referring now more concretely to its constitution, it is a vibration-damping section with sound absorbing material comprising a flat hollow frame as a whole including a sound proof panel constituting a top surface, a porous panel constituting bottom surface of the above described sound proof panel, a sound absorbing room formed therebetween, a connecting section formed on both sides of the sound absorbing room for closely connecting the sound absorbing room one another and a joint for hanging formed in the center of the sound proof panel, and it is the vibration-damping section with sound absorbing material comprising vibration damping material stuck on the sound absorbing room side of the sound proof panel in the above described hollow frame and sound absorbing material disposed in the sound absorbing room.

Such vibration-damping section with sound absorbing material formed as above described is effective for reducing solid-borne noise, for example, if it is disposed on the whole bottom surface of the expressway bridge structure.

Such vibration-damping section with sound absorbing material has a sound insulating effect of the radiated noise caused by the elevated bridge structure made of steel and a sound absorbing effect of the reflected noise and moreover has the vibration damping effect of decreasing occurrence of the secondary noise by reducing the vibration of the sound absorbing panel. Since the connecting sections are formed on both sides of the sound absorbing room for closely connecting the sound absorbing rooms one another, the vibration-damping section with sound absorbing material can be connected in a width direction to be disposed on the whole bottom surface of the elevated bridge. Moreover, since the sound proof panel with a flat surface forms a plane under the whole bottom surface of the girder by connecting the vibration-damping section with sound absorbing material, it can be used as a scaffold for the maintenance thereof.

DETAILED DESCRIPTION OF PREFERRED EMBODIMENT

Embodiment disposed under the elevated bridge will now be described in further detail with reference to the accompanying drawings as preferred embodiment according to the present invention.

Figure 1:
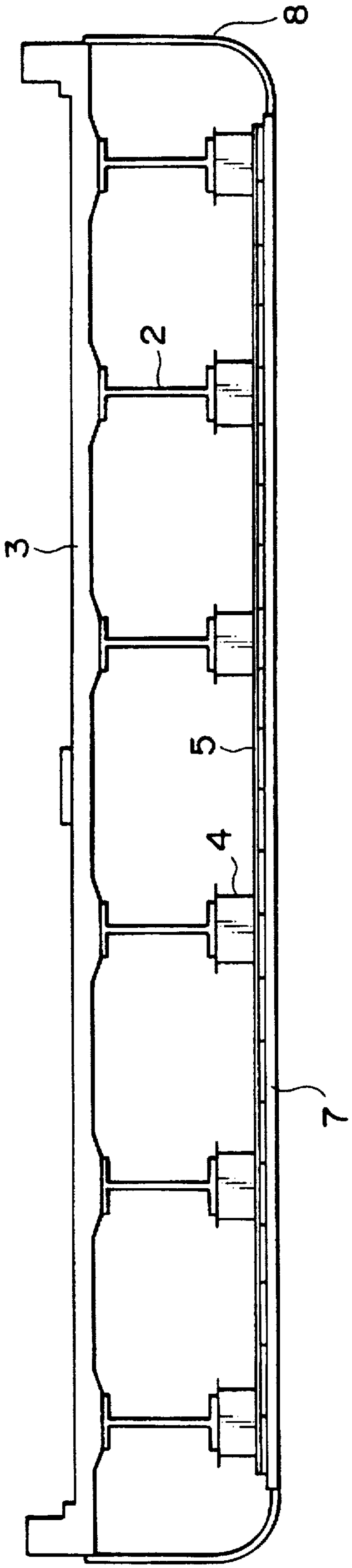
FIG. 1 is a sectional view showing the whole structure of an elevated bridge and a vibration-damping section with sound absorbing material disposed on the whole bottom surface thereof.
Figure 4:
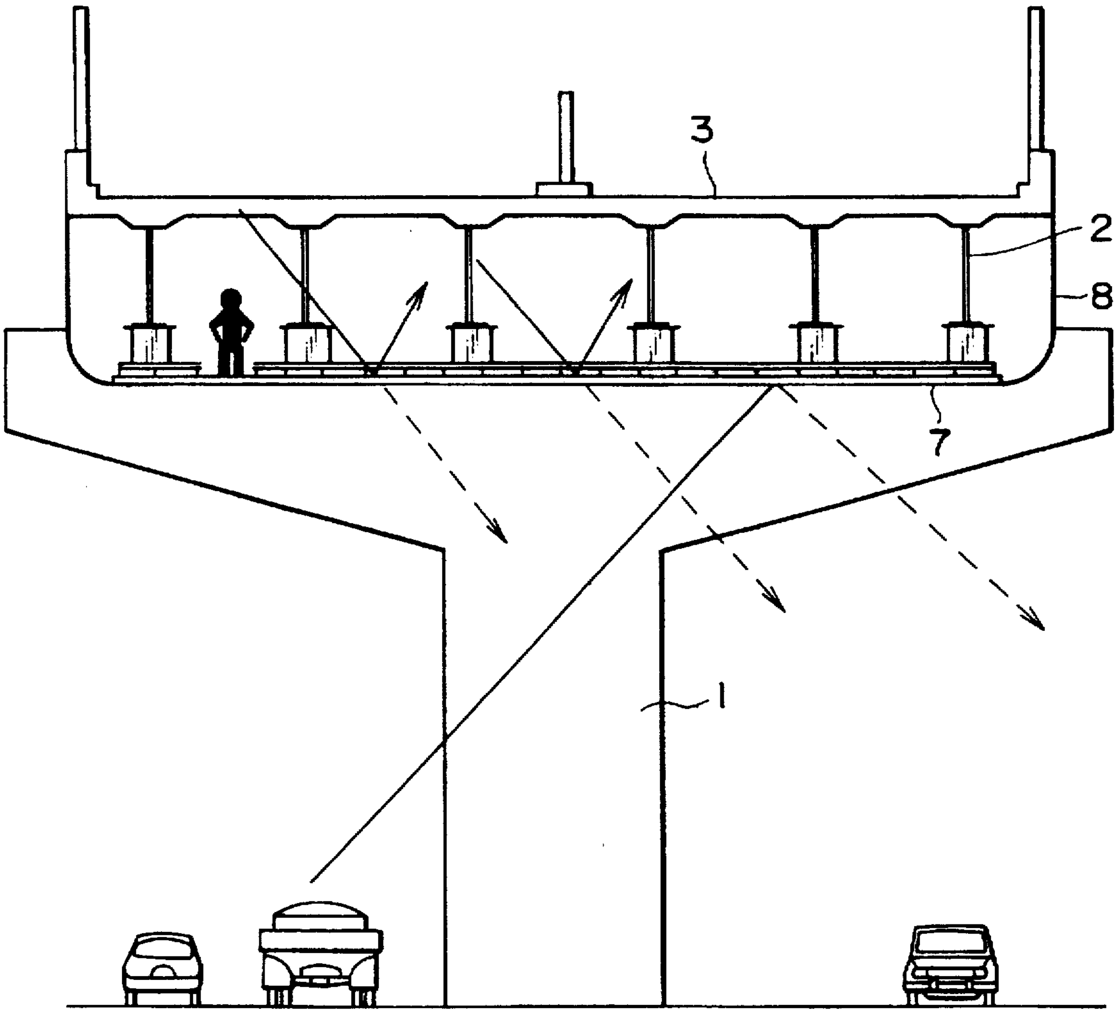
FIG. 4 is a sectional view illustrating the effect of a vibration-damping section with sound absorbing material according to the present invention.

As shown in FIG. 1 and FIG. 4, I-section steel girders 2 are fixed on a bridge pier 1 and a floor panel 3 is fixed on the I-section steel girders 2. A steel section 4 is fixed on the bottom flange of the steel girder 2 and a steel section 5 stretching in a width direction is fixed on the bottom of the steel section 4 and many hanger bolts 6 are fixed on the steel section 5 and a vibration-damping section with sound absorbing material 7 hangs on the hanger bolts. The vibration-damping section with sound absorbing material 7 is connected one another to be disposed on the whole bottom surface of the steel girder 2 and vibration damping material 8 is disposed on both sides under the floor panel 3 and both side ends of the vibration-damping section with sound absorbing material 7 and the bottom sides of the vibration damping material 8 are connected, that is, the floor panel 3 and the whole bottom surface of the steel girder 2 are wrapped with the vibration-damping section with sound absorbing material 7 and the vibration damping material 8.

Figure 2:
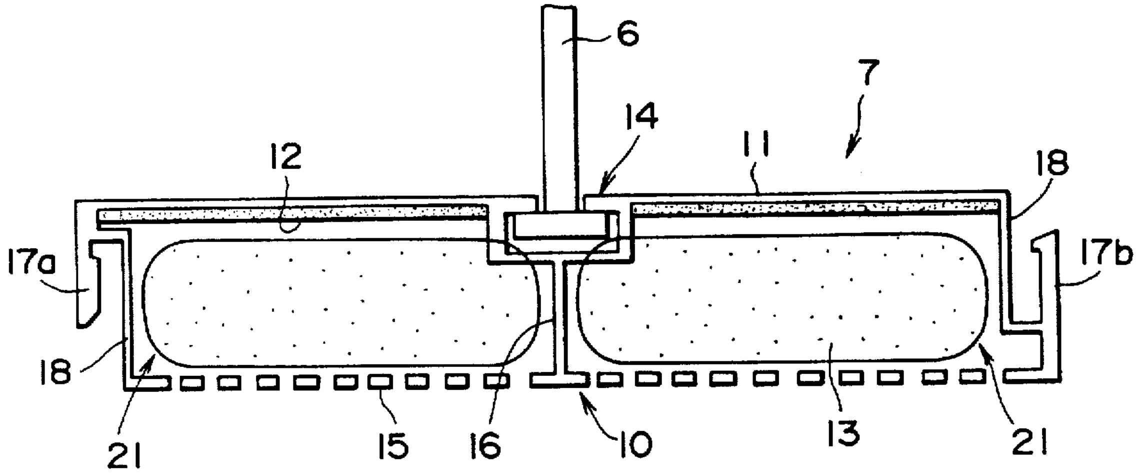
FIG. 2 is a sectional view illustrating the structure of one unit of a vibration-damping section with sound absorbing material according to the present invention.

As shown in FIG. 2, the vibration-damping section with sound absorbing material 7 is a unit comprising a hollow frame 10 with a flat shape as a whole, vibration damping material 12 made of bituminous resin fused on the inner surface of the sound proof panel 11 constituting the flat surface of the hollow frame 10 and sound absorbing material 13 inserted in the hollow space of the hollow frame, that is, a sound absorbing room, such as glass wool, rock wool, foaming aluminum or foaming concrete etc.

The hollow frame 10 comprises a sound proof panel 11 forming the surface of the hollow frame, a joint 14 having a recessed groove in which a hanger bolt 6 is inserted in the center of the sound proof panel 11 and engaging the head of the hanger bolt 6, a porous panel 15 disposed on the bottom surface, a rib 16 connecting the joint 14 and the porous panel 15 at the center in a width direction, connecting sections 17*a*, 17*b* for connecting one another at the end sections in a width direction and side wall panels 18 closing both side ends of the sound absorbing room 21 at the side ends thereof; therefore a space surrounded by the sound proof panel 11, the porous panel 15, the rib 16 and the side wall panel 18 constitutes the sound absorbing room 21.

Figure 3:
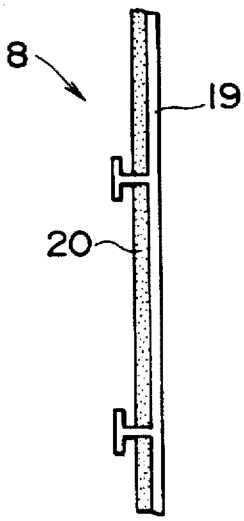
FIG. 3 is a sectional view of vibration damping material disposed on the bottom surface of the floor panel with a vibration-damping section with sound absorbing material.

The hollow frame 10 can be integrally molded by extruding aluminum alloy. Moreover, the porous panel 15 can also be integrally molded with the hollow frame 10. In this case the extruded panel can be properly pierced by holes to become the porous panel 15. But it is also possible that some or the whole part of the porous panel 15 is not integrally molded by extrusion process but that the expanded metal or punched metal with a suitable aperture ratio can be fixed thereon. On the other hand, the vibration damping material 8, as shown in FIG. 3, comprises a sound proof panel 19 made of extruded aluminum alloy having reinforcing ribs at suitable intervals and vibration damping resin 20 made of bituminous resin, for example, fused on the vibration damping material.

By disposing many vibration-damping sections with sound absorbing material 7 in parallel on the whole bottom surface of the girder 2 as above described and by disposing the sound damping material 8 under and on the side of the floor panel 3, as shown in FIG. 4, solid-borne noise which is radiated via the steel girder 2 and the floor panel 3 by the vibration generated by the vehicles running on the elevated bridge road is prevented by the sound proof panel 11 of the vibration-damping sections with sound absorbing material 7 and the sound damping material 8 and, moreover, vibration transferred to the sound proof panel 11 and the sound damping material 8 is damped by the effect of vibration damping materials 12 and 20, which greatly reduces solid-borne noise secondarily radiated outside. Moreover, the above described vibration-damping sections with sound absorbing material 7 can be closely connected by combining adjacent connecting sections 17*a* and 17*b* one another to prevent the solid-borne noise from leaking. Noise generated by the vehicles running on the flat road can be damped by the sound absorbing material 13 in the sound absorbing room of the vibration-damping section with sound absorbing material 7 thereby to reduce the reflected noises.

Further, the surface of the vibration-damping section with sound absorbing material 7 can be used as a suspension scaffold for maintenance because the flat sound proof panels 11 are connected one another to make a plane.

The present invention is not limited to the structure shown in FIG. 2 and can have various kinds of structures in the constitution comprising a sound proof panel 11, a sound absorbing material 13 disposed under the sound proof panel 11, vibration damping materials 12 and 20 stuck on the top surface or the bottom surface of the above described sound proof panel 11.

For example, the porous panel, the connecting section and the joint existing as the parts of the structure of the extruded material of the vibration-damping section with sound absorbing material shown in FIG. 2 can be fixed if they are necessary and the sound proof panel or the joint can be integrally molded, or assembled, or formed by bending aluminum plate or steel plate instead of the extruded material, or made of rolling material. Moreover, the clad structure which sandwiches the vibration damping material between aluminum plates or steel plates can also be used. But the extruded material takes the advantage over the other ones because it can be easily formed into a complex sectional shape having the connecting section or the joint and have enough strength for a scaffold when the vibration-damping section with sound absorbing material is used as a scaffold. Bituminous resin is suitable for the vibration damping material. Specifically, what is made by blending synthetic rubber, petroleum resin and filling material with asphalt in a fixed ratio is more suitable for the vibration damping material and foaming agent can be added to this. Such bituminous resin is fused on the required surface of the hollow frame. What is made by blending inorganic light weight aggregate, powder filler, fibrous filler and quicklime in a fixed ratio is recommended for the above described filling material.

Furthermore, it is possible to provide sound absorbing effect without sound absorbing material. Specifically, it is possible to produce sound absorbing effect by providing a plurality of cavities and holes leading to the outside in the suitable places of the sound absorbing room 21 or the hollow frame 10 according to the Helmholtz's resonator principle and also to attain vibration damping effect in combination with the vibration damping material.

As a suitable embodiment, reducing effect of the solid-borne noise in the case that the vibration-damping section with sound absorbing material according to the present invention has the constitution shown in FIG. 2 and is fixed on the bottom surface of the girder of the elevated girder road will be described next.

Figure 5:
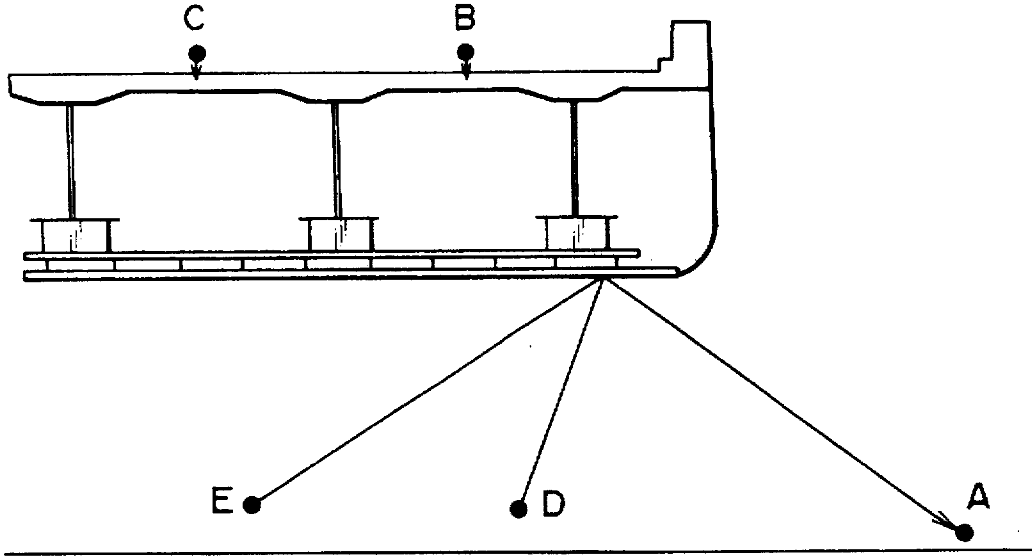
FIG. 5 is a sectional view illustrating the method of testing the embodiments.

A part of a life-sized elevated bridge road, that is to say, one side of the road with two lanes comprising I-section steel girders and floor panels, as shown in FIG. 5, was made and installed in a large unechoic room. The whole bottom surface of this girder was covered with the vibration-damping section with sound absorbing material 7 having the structure shown in FIG. 2 and the vibration damping material 8 having the structure shown in FIG. 3. The above described vibration-damping section with sound absorbing material was made by a hollow frame of integrally extruded aluminum having a length of 4000 mm, a width of 932 mm and a height of 60 mm, on which bituminous resin for damping vibration was stuck and whose sound absorbing room was filled with glass wool protected by polyvinyl fluoride having a density of 32 kg/M$^3$; this is made an embodiment 1 according to the present invention.

On the other hand, a girder whose bottom surface was covered with the decorative steel plate of 1.2 mm thick as in the case of the embodiment 1 and was provided with cylindrical sound absorbing bodies having a diameter of 180 mm and made of foaming aluminum at 300 mm intervals was prepared as a comparison 1; moreover, a girder provided with nothing was made a comparison 2.

Figure 7A:
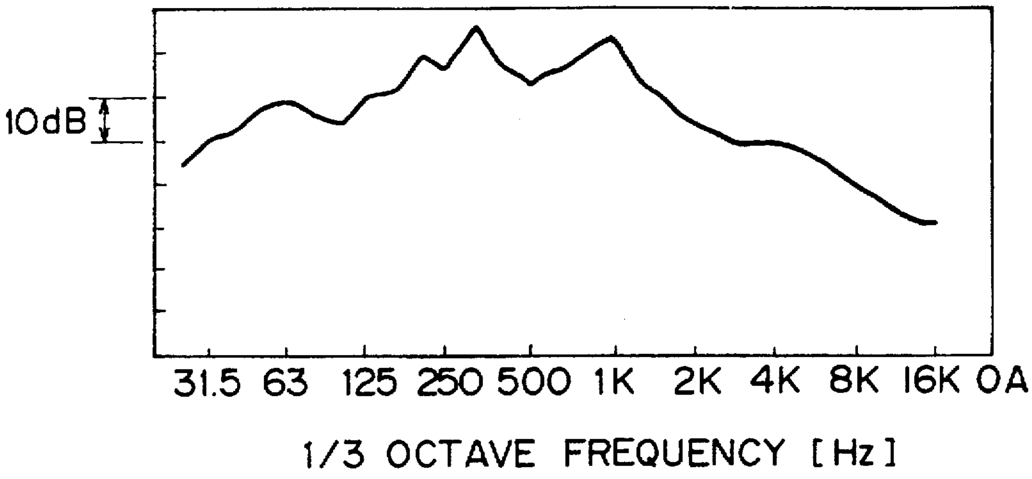
FIGS. 7A and B are graphs showing actually measured values of vibration of a highway elevated bridge during running of a large-sized motor vehicle in used in an embodiment 2.
Figure 7B:
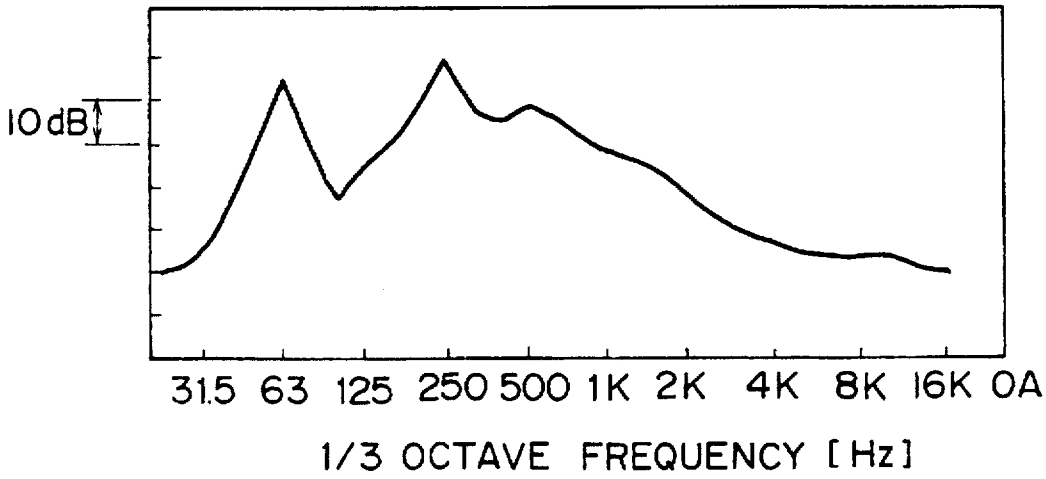

Vibration was given with hammering to the floor panel of embodiment 1, comparison 1 and comparison 2, respectively and girder vibration were measured and radiated noise were measured at the position equivalent to the surface of the earth in the outside of the elevated bridge road (A point in FIG. 5). Taking actual frequency characteristic of vibration of an elevated bridge road under running of a large-sized motor vehicle into account, radiated noise equivalent to that generated by a running large-sized motor vehicle was calculated from the already measured radiated noise. Results of measurements in the case that vibration equivalent to that generated by a running large-sized motor vehicle was given on the nearside lane (B point in FIG. 5) is shown in Table 1 and results of measurements in the case that vibration equivalent to that generated by a running large-sized motor vehicle was given on the passing lane (C point in FIG. 5) is shown in Table 2. Here, the actual vibration of an elevated bridge road under running of a large-sized motor vehicle is a measured value of a highway elevated bridge road when a large-sized motor vehicle is actually running. Concretely, the values are shown in FIGS. 7A and B. As it is clear from Table 1 and Table 2, it was verified that the embodiment 1 fixed with the vibration-damping section with sound absorbing material according to the present invention had a reduced sound of 12 dB and could remarkably reduce solid-borne noise radiated from the elevated bridge structure in comparison with the comparisons 1 and 2. White noise signal was generated by with a speaker at the position equivalent to a flat road and reflected noise was measured at the position equivalent to the surface of the earth in the outside of the elevated bridge road (A point in FIG. 5). Taking the frequency characteristic of noise during running of a large-sized motor vehicle into account, radiated noise equivalent to that generated by a running large-sized motor vehicle was calculated from the already measured radiated noise.

Figure 8:
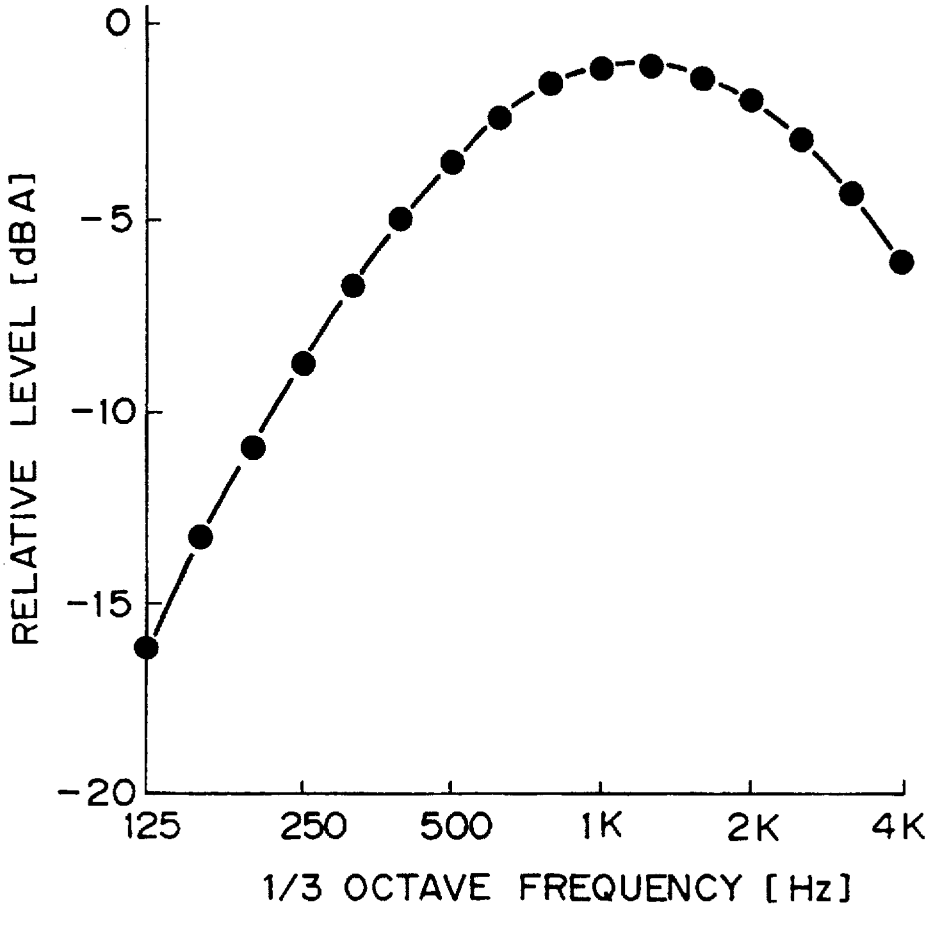
FIG. 8 is a graph showing a frequency characteristic of traffic noise during running of a large-sized motor vehicle used in an embodiment 2.

Results of measurements in the case that vibration equivalent to that generated by a running large-sized motor vehicle was given on the position equivalent to the nearside lane of the flat road (D point in FIG. 5) are shown in Table 3 and results of measurements in the case that vibration equivalent to that generated by a running large-sized motor vehicle was given on the position equivalent to the passing lane (E point in FIG. 5) are shown in Table 4. Here, the frequency characteristic of noise during running of a large-sized motor vehicle is concretely shown in FIG. 8. As it is clear from Table 3 and Table 4, it was verified that the embodiment 1 fixed with the vibration-damping section with sound absorbing material according to the present invention has a sound absorbing effect of reflected sound as in the case of the cylindrical sound absorbing body of comparison 1. But it is a little inferior to comparison 1 in the sound absorbing effect and, as below described, it is easy to improve only the sound absorbing effect while unchanging the sound insulating effect and the vibration damping effect of the vibration-damping section with sound absorbing material.

Figure 6:
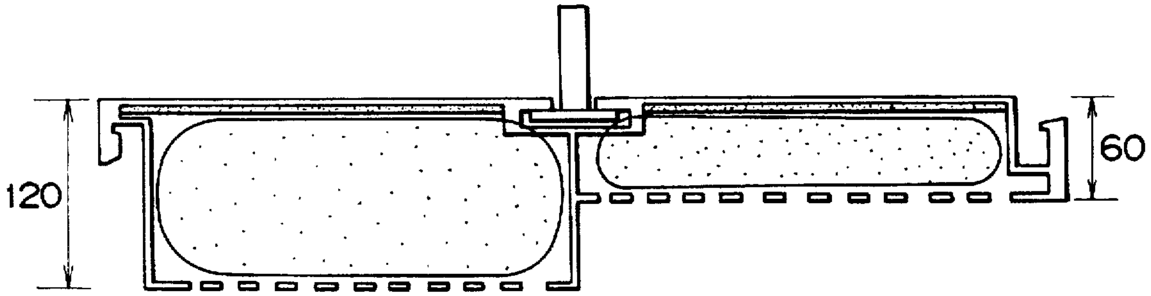
FIG. 6 is a sectional view illustrating the structure of one unit of a vibration-damping section with sound absorbing material used in embodiment 2.

By using embodiment 2 made of the vibration-damping section with sound absorbing material having a structure shown in FIG. 6 (extruded aluminum having different heights of 120 mm and 60 mm and the same other sizes, vibration damping material and sound absorbing material as the above described vibration-damping section with sound absorbing material), noise equivalent to that generated by a really running vehicle was caused at the position of the embodiment 2 equivalent to the nearside lane of a flat road (D point in FIG. 5) on the same conditions as the above described experiment on the flat road and reflected noise was measured at the position of the embodiment 2 equivalent to the surface of the earth in the outside of the elevated bridge road (A point in FIG. 5). The results of measurements are shown in Table 5 and the results of comparisons 1 and 2 are also shown in Table 5. Table 5 clearly shows that embodiment 2 has better sound reducing effect than comparison 2 and it is strongly possible to improve only sound absorbing effect while unchanging basic constitution of the vibration-damping section with sound absorbing material according to the present invention, if necessary. Moreover, the following means are expected as means for improving the sound absorbing effect: for example, changing polyvinyl fluoride for protecting sound absorbing material for glass cloth, using sound absorbing material made of glass wool with high density and making projecting parts on the sound absorbing surface (porous panel).

Since the vibration-damping section with sound absorbing material according to the present invention has above described structure, in particular, it can be fixed on the bottom surface of an elevated bridge and has a sound insulating effect of the radiated noise and a sound absorbing effect of the reflected noise which are caused by the elevated bridge structure and moreover has a vibration damping effect of decreasing occurrence of the secondary noise by reducing the vibration of the sound absorbing panel. Since the connecting sections are provided at both side ends of the sound absorbing rooms one another, the damping aluminum composite with sound absorbing material can be connected in a width direction and be disposed on the whole bottom surface of the elevated bridge structure, it can be used as a scaffold for the maintenance thereof.

TABLE 1

The case of a large-sized motor vehicle running on a nearside lane

| Condition | Estimated OA value | Reduced sound | |
|---|---|---|---|
| Without bottom panel | 80.1 dBA | 0 | Comparative Example 2 |
| Decorative plate + Cylindrical sound absorbing body | 74.9 dBA | 5.2 dB | Comparative Example 1 |
| Vibration-damping section with sound absorbing material | 68.4 dBA | 11.7 dB | Example 1 |

TABLE 2

The case of a large-sized motor vehicle running on a passing lane

| Condition | Estimated OA value | Reduced sound | |
|---|---|---|---|
| Without bottom panel | 78.9 dBA | 0 | Comparative Example 2 |
| Decorative plate + Cylindrical sound absorbing body | 72.8 dBA | 6.1 dB | Comparative Example 1 |
| Vibration-damping section with sound absorbing material | 66.4 dBA | 12.5 dB | Example 1 |

TABLE 3

The case of a large-sized motor vehicle running on a nearside lane

| Condition | Estimated OA value | Reduced sound | |
|---|---|---|---|
| Without bottom panel | 80.0 dBA | 0 | Comparative Example 2 |
| Decorative plate + Cylindrical sound absorbing body | 76.2 dBA | 3.8 dB | Comparative Example 1 |
| Vibration-damping section with sound absorbing material | 76.6 dBA | 3.4 dB | Example 1 |

TABLE 4

The case of a large-sized motor vehicle running on a passing lane

| Condition | Estimated OA value | Reduced sound | |
|---|---|---|---|
| Without bottom panel | 80.0 dBA | 0 | Comparative Example 2 |
| Decorative plate + Cylindrical sound absorbing body | 75.5 dBA | 4.5 dB | Comparative Example 1 |
| Vibration-damping section with sound absorbing material | 75.9 dBA | 4.1 dB | Example 1 |

TABLE 5

The case of a large-sized motor vehicle running on a nearside lane

| Condition | Estimated OA value | Reduced sound | |
|---|---|---|---|
| Without bottom panel | 80.0 dBA | 0 | Comparative Example 2 |
| Decorative plate + Cylindrical sound absorbing body | 76.2 dBA | 3.8 dB | Comparative Example 1 |
| Vibration-damping section with sound absorbing material | 75.2 dBA | 4.8 dB | Example 1 |

What is claimed is:

1. A vibration-damping section comprising:

a flat hollow frame comprised by a sound proof panel and a porous panel, wherein a sound absorbing space is defined between the sound proof panel and the porous panel;

vibration-damping material adhered to said sound proof panel in the sound absorbing space; and sound absorbing material in said sound absorbing space.

2. The vibration-damping section of claim 1 including means for hanging said vibration-damping section from an elevated bridge girder.

3. The vibration-damping section of claim 1 including means for connecting plural ones of said flat hollow frames to one another.

4. A vibration-damping section fixed to a bottom surface of an elevated bridge girder, comprising:

a flat hollow frame comprised by a sound proof top panel and a porous bottom panel, wherein a sound absorbing space is defined between the sound proof top panel and the porous bottom panel;

vibration-damping material adhered to said sound proof panel in the sound absorbing space;

sound absorbing means in said sound absorbing space;

a joint in said top panel for hanging the flat hollow frame from a bottom surface of an elevated bridge girder; and connecting elements on said flat hollow frame for connecting plural ones of said flat hollow frames to one another.

5. The vibration-damping section of claim 4 wherein said flat hollow frame is an aluminum or aluminum alloy extrusion.

6. The vibration-damping section of claim 4 wherein said sound absorbing means in said sound absorbing space comprises forming the sound absorbing space as a Helmholtz chamber.

7. The vibration-damping section of claim 4 wherein said sound absorbing means in said sound absorbing space comprises sound absorbing material in said sound absorbing space.

8. The vibration-damping section of claim 7, wherein said sound absorbing material is glass wool.

9. The vibration-damping section of claim 4, wherein said vibration-damping material is bituminous resin.

* * * * *